United States Patent
Weigand

(10) Patent No.: US 7,672,532 B2
(45) Date of Patent: Mar. 2, 2010

(54) DITHERED ENCODING AND DECODING INFORMATION TRANSFERENCE SYSTEM AND METHOD

(75) Inventor: David L. Weigand, Santa Clara, CA (US)

(73) Assignee: Exphand Inc., San Francisco, CA (US)

( * ) Notice: Subject to any disclaimer, the term of this patent is extended or adjusted under 35 U.S.C. 154(b) by 1556 days.

(21) Appl. No.: 10/882,533

(22) Filed: Jul. 1, 2004

(65) Prior Publication Data

US 2006/0013502 A1  Jan. 19, 2006

(51) Int. Cl.
*G06K 9/40* (2006.01)
(52) U.S. Cl. .................. 382/274; 382/275; 382/254
(58) Field of Classification Search .......... 382/275, 382/274, 254–258
See application file for complete search history.

(56) References Cited

U.S. PATENT DOCUMENTS

| | | | |
|---|---|---|---|
| 5,799,111 A | 8/1998 | Guissin | |
| 6,028,677 A | 2/2000 | Keithley | |
| 6,292,268 B1 | 9/2001 | Hirota et al. | |
| 6,499,662 B1 | 12/2002 | Coleman et al. | |
| 6,608,702 B1 | 8/2003 | Urasawa | |
| 2003/0021437 A1* | 1/2003 | Hersch et al. | 382/100 |

OTHER PUBLICATIONS

PCT Notification of Transmittal of The International Search Report and The Written Opinion of the International Searching Authority, or the Declaration (PCT Rule 44.1), dated May 4, 2006, International Application No. PCT/USO5/22617).

* cited by examiner

*Primary Examiner*—Wesley Tucker
(74) *Attorney, Agent, or Firm*—Michael A. Glenn; Glenn Patent Group

(57) ABSTRACT

Methods for encoding transitions between low-intensity regions and high-intensity regions such that the transitions are more readily detectable in a digital image captured by a digital image capture device. The encoding applied to the transitions act to retard and minimize blooming effects and ISI that can occur in the digital image, especially when the transitions are captured from a television, computer display screen or other transmissive media.

43 Claims, 11 Drawing Sheets

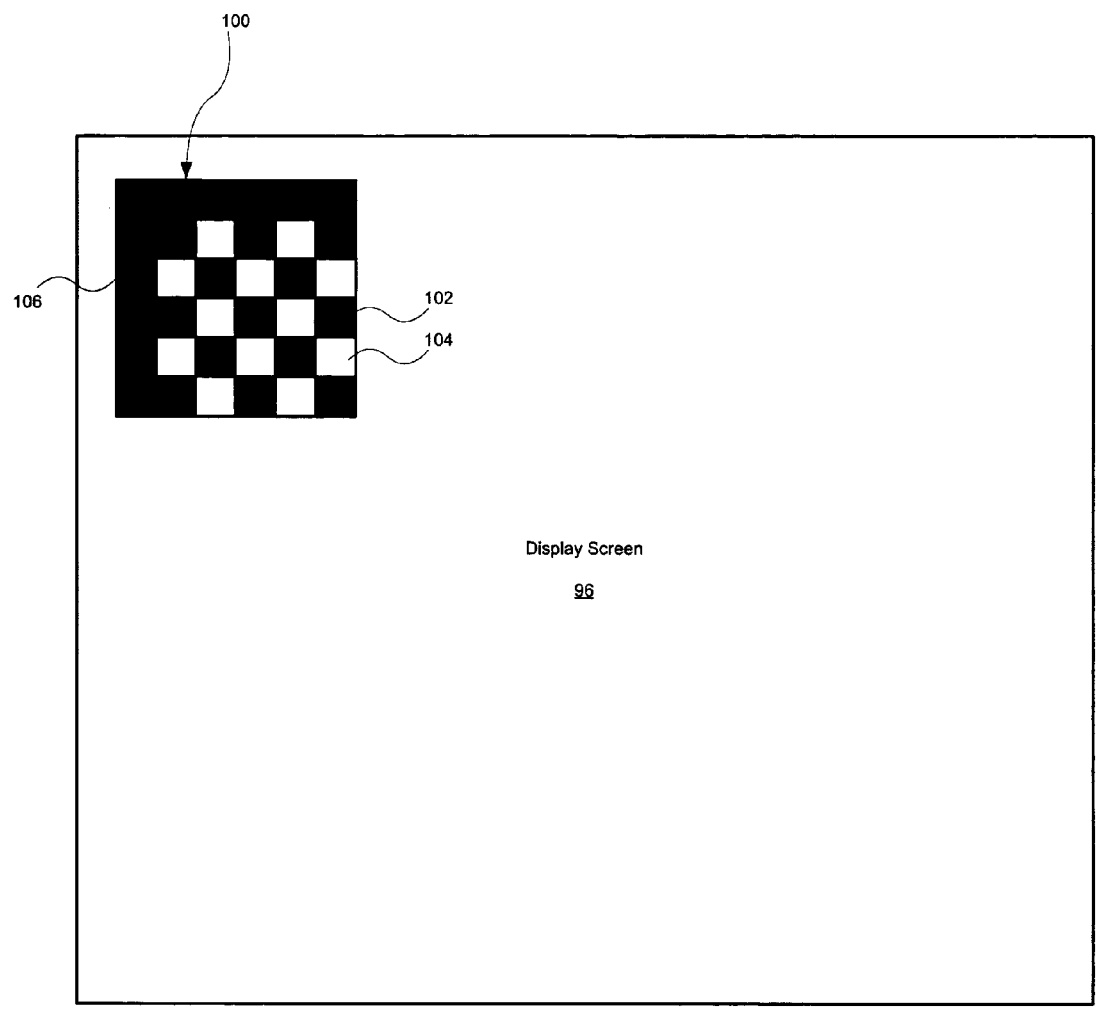
FIG._1

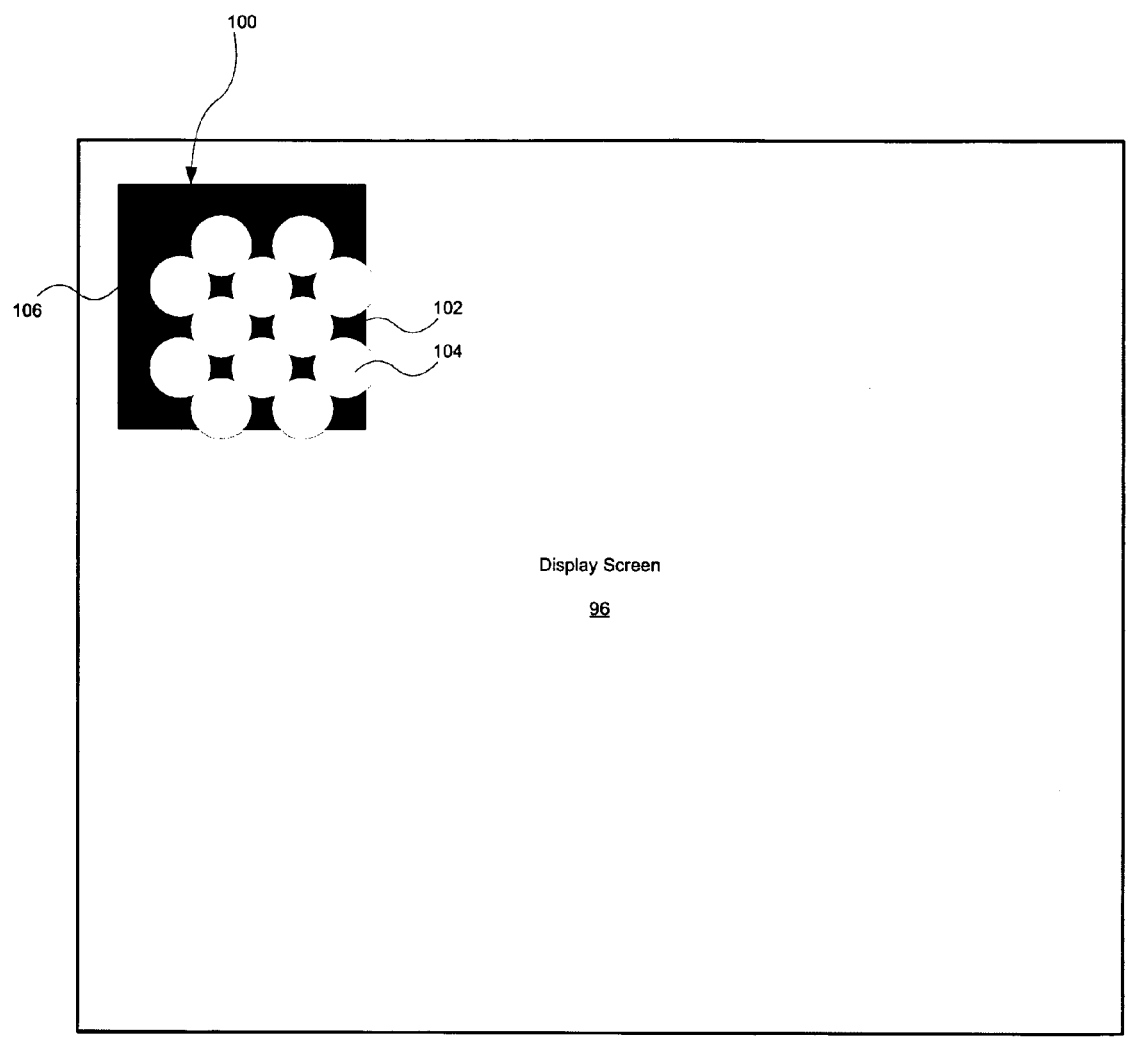
FIG._2

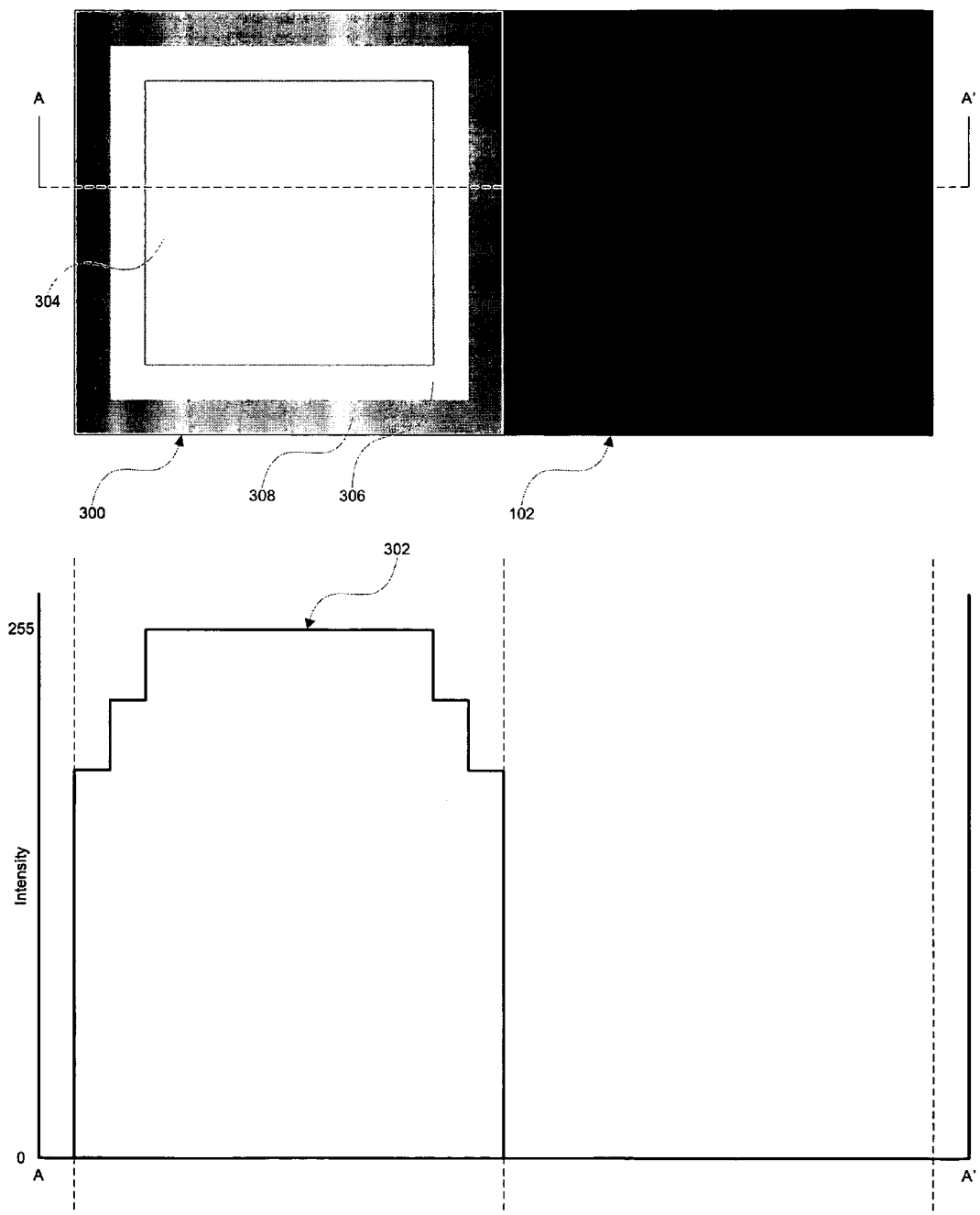
FIG._3A

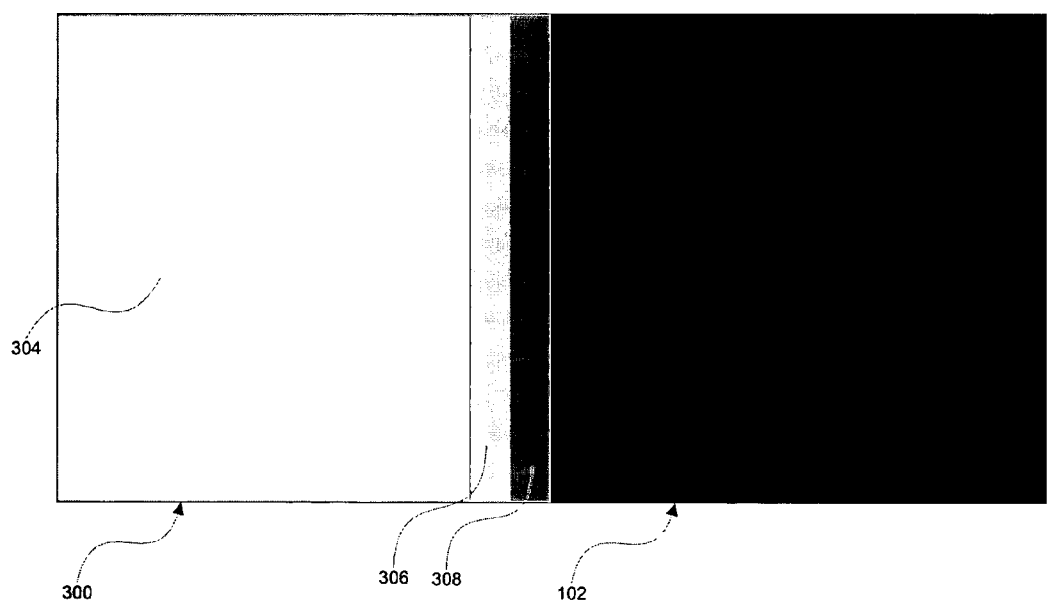
FIG._3B

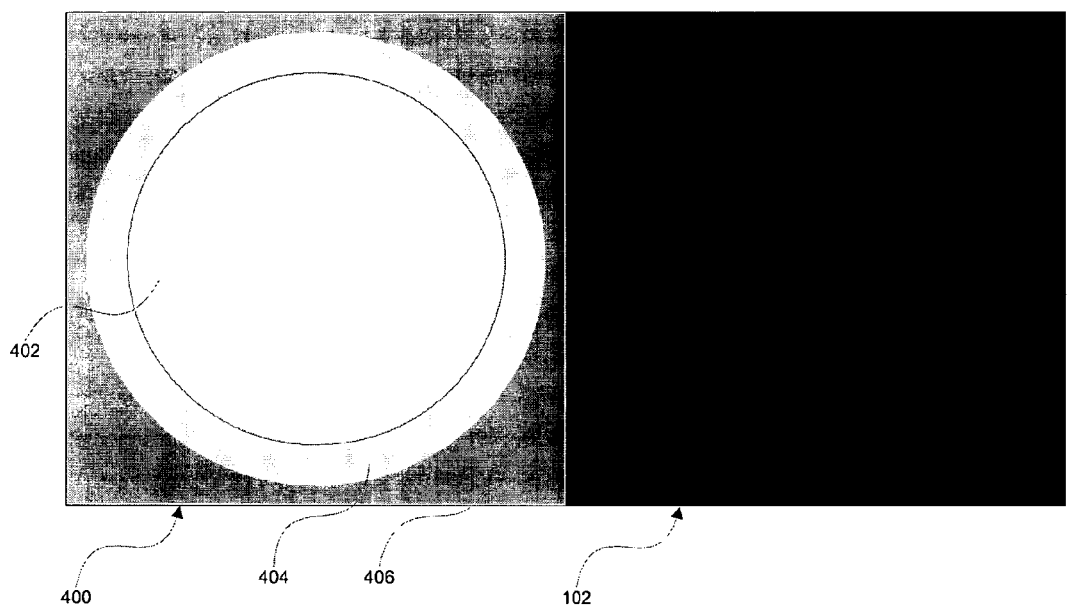
FIG._4

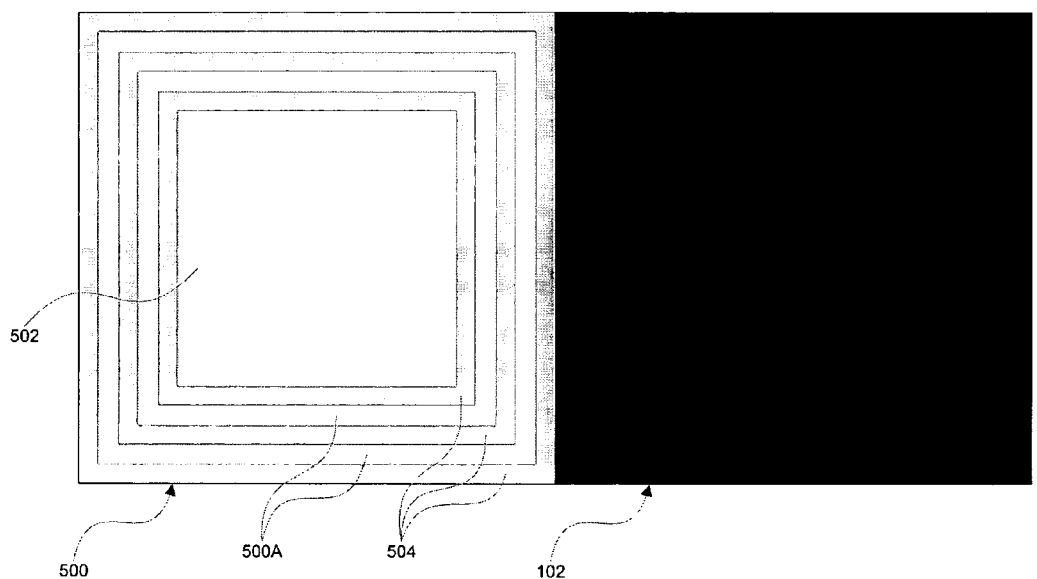
FIG._5

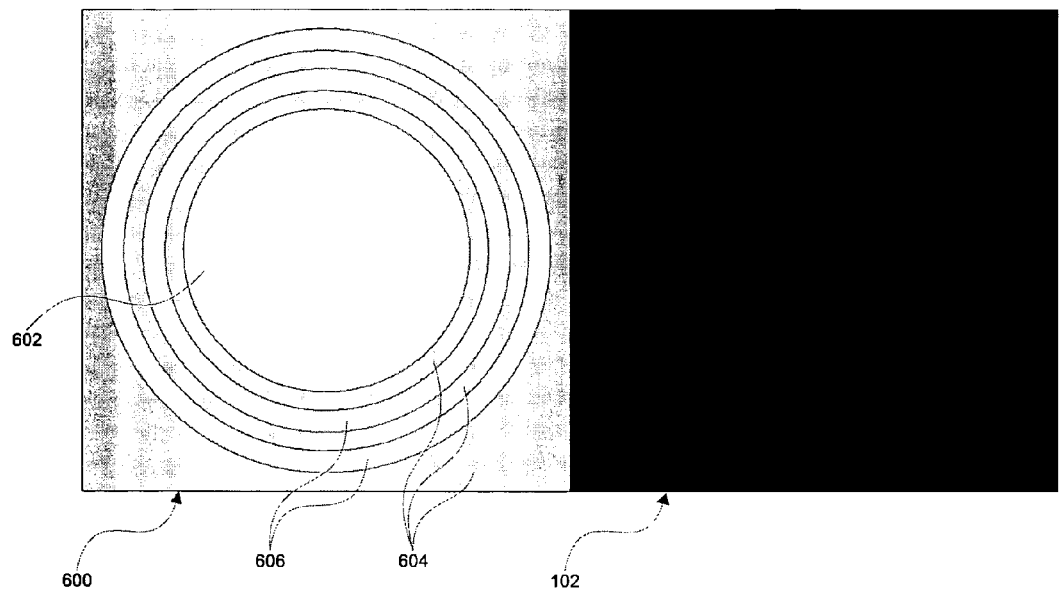
FIG._6

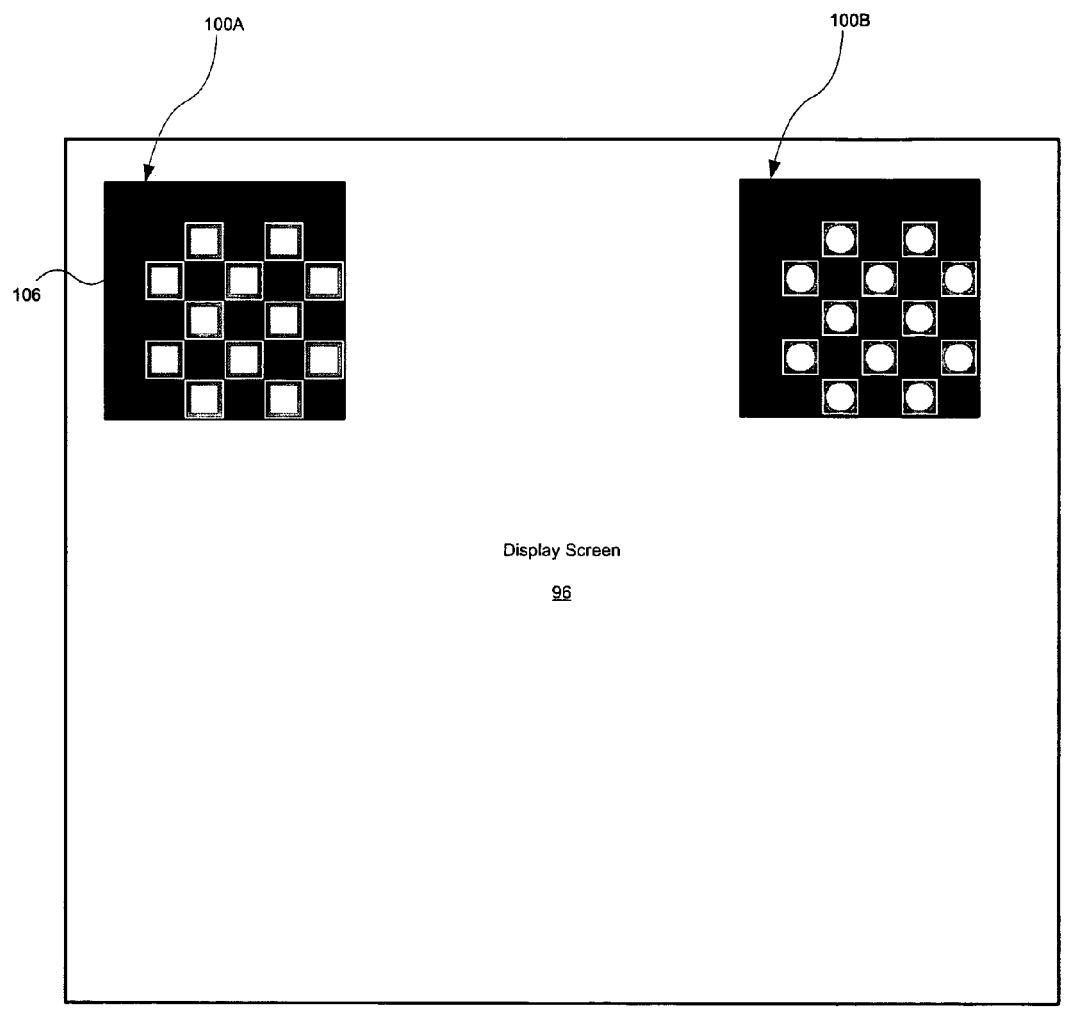
FIG._7

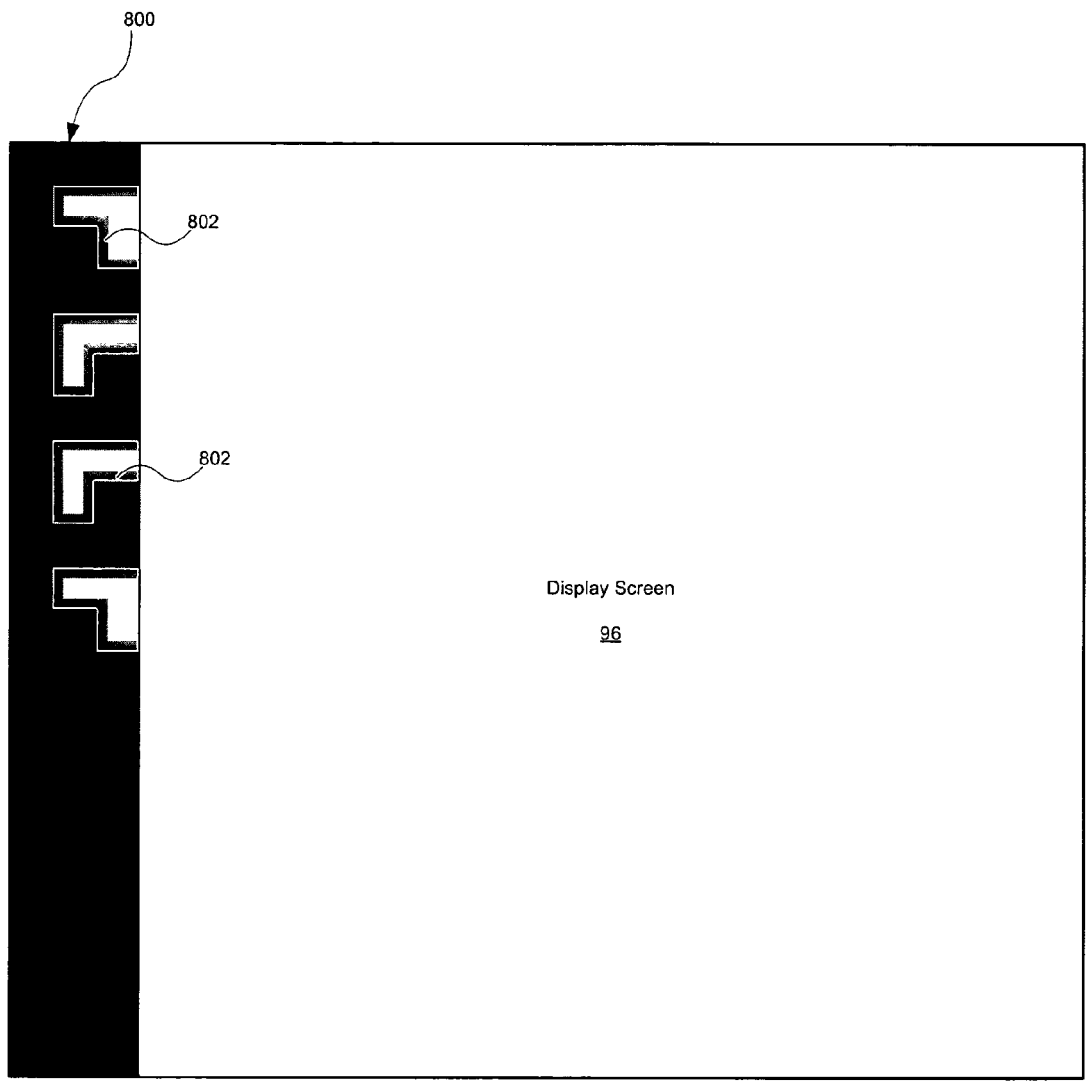
FIG._8

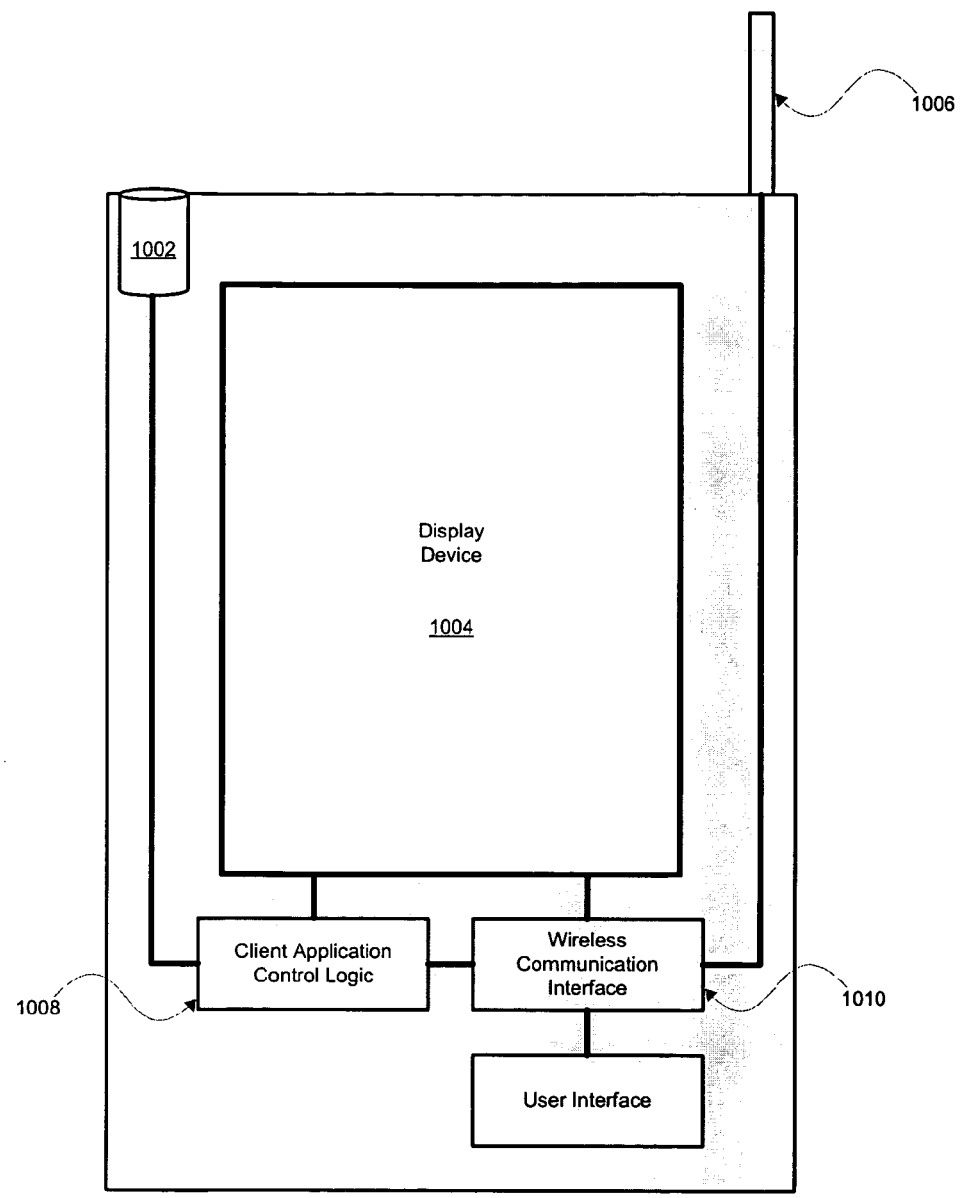
FIG._10

DITHERED ENCODING AND DECODING INFORMATION TRANSFERENCE SYSTEM AND METHOD

FIELD OF THE INVENTION

The present invention, in one implementation, relates to a method that facilitates the capture of transitions between two differently colored regions by a digital image capture device. In one implementation, the present invention has application to an interactive electronic commerce system that utilizes dithered code blocks to communicate message codes to users viewing television and other video images.

BACKGROUND OF THE INVENTION

Technologies have recently been developed that enable information to be transmitted to electronic devices by means such as television and print media. For example, U.S. patent application Ser. No. 10/673,047, filed on Sep. 26, 2003 and entitled "Block-Based Encoding and Decoding Information Transference System and Method," and U.S. patent application Ser. No. 10/618,445, filed on Jul. 11, 2003 and entitled "Interactive Electronic Commerce and Message Interchange System," both of which are hereby incorporated by reference, disclose methods and systems that enable the transmission of a message carrier within a stream of video and television data. This message carrier is subsequently captured by an electronic device and decoded to identify a message code. The message code facilitates financial transactions and data interchange, as well as dissemination, management and exchange of commercial information, for example, advertising, promotions, sales announcements, and the like. The message carriers and message codes are disseminated through advertising and content from analog and digital television broadcasts, television receivers, the Internet, wireless signals, satellite broadcasts, and print media.

In the above referenced patent applications, the message carrier is typically captured by a Universal Digital Assistant (UDA), such as a personal digital assistant (PDA), using a digital camera. The UDA captures a digital image of a television screen displaying the message carrier, and software methods are then used to analyze the digital picture and resolve the message code contained in the message carrier. As disclosed in U.S. patent application Ser. No. 10/673,047, the message carrier can be an image composed of blocks representing data that is shown on a television screen (e.g., as shown in FIG. 1). These blocks can vary in color and/or intensity to convey the data. For instance, this block-based encoding scheme can use low-intensity blocks to represent one bit value and high-intensity blocks to represent another bit value.

Unfortunately, complications can arise when capturing a digital image of a message carrier that is being shown on a television or computer display. A digital camera uses an image sensor, such as a charge-coupled device (CCD) or a complementary metal-oxide semiconductor (CMOS) sensor, to capture a digital image. The image sensor is generally composed of thousands of photosites that receive light passing through the lens of the digital camera. This light is converted into electrical charges by the photosites and there is a limit to how much charge each photosite can store. If there is too much charge for one photosite, the charge will overflow to neighboring photosites causing a two-dimensional inter-symbol interference (ISI) effect which is called image blooming or streaking.

Conventional digital camera images generally do not suffer from blooming effects because the light captured by the photosites is simply ambient light reflected by subjects within the image. Unlike conventional images, a digital image of a television or computer display is more susceptible to blooming or inter-symbol interference effects because these displays are transmitters of light, and do not simply reflect ambient light. The large amount of light transmitted by a television or computer display, especially from white or high-intensity regions on the display, can easily overload one or more photosites of an image sensor, thereby inducing the blooming effects. If such blooming effects occur within a message carrier, the integrity of the data being conveyed can be corrupted or destroyed. Specifically, this blooming effect can obscure or blur the transitions between the low-intensity bits and the high-intensity bits in the block-based encoding scheme discussed above (e.g., as shown in FIG. 2), rendering it more difficult, and in some instances impossible, to detect these transitions and decode the message carrier.

Another complication we have mentioned that can arise when capturing a digital image from a television or computer display is called intersymbol interference (ISI). In a digital transmission system, intersymbol interference refers to distortion of a received signal, that distortion being manifested in the temporal spreading and consequent overlap of portions of the signal to the degree that the receiver cannot reliably distinguish between changes of state, for example, between individual signal elements. Similar to blooming effects, ISI can blur transitions between low-intensity bits and high-intensity bits.

Accordingly, methods are needed to minimize the effect of blooming and ISI when capturing digital images of message carriers being shown on television or computer displays.

SUMMARY OF THE INVENTION

The invention provides methods for encoding transitions between low-intensity regions and high-intensity regions such that the transitions are more readily detectable in a digital image captured by a digital image capture device. The encoding applied to the transitions act to retard and minimize blooming effects and ISI that can occur in the digital image, especially when the transitions are captured from a television, computer display screen or other transmissive media.

The dithering method described herein can be used in connection with a graphical message carrier transmitted in television or other video signals. In one implementation, a block-based message carrier containing at least one message code is transmitted with a video or television signal. The message carrier includes transitions between low-intensity regions and high-intensity regions that represent data. The message carrier is shown on a display screen and subsequently captured by taking a digital image of the display screen; the digital image is then decoded to identify the at least one message code. The high-intensity regions of the message carrier include dithered encoded regions to counteract blooming effects and ISI in the digital image. The dithered regions border at least the transitions in the high intensity regions and have a lower intensity level than the high-intensity regions. Photosites associated with the dithered regions are therefore no longer at the highest intensity level and can absorb overflowing charge from the bordering high intensity regions. This substantially prevents the charge at these photosites from overflowing into low-intensity regions of the message carrier captured by the digital imaging device, thereby minimizing corruption of the transitions between high-intensity regions and low-intensity regions.

DESCRIPTION OF THE DRAWINGS

FIG. 1 illustrates a screen display including one implementation of a message carrier.

FIG. 2 illustrates the blooming effects associated with a message carrier displayed by a television or other display device.

FIG. 3A illustrates one implementation of a dithered white block adjacent to a black block, as well as its corresponding intensity profile.

FIG. 3B illustrates one implementation of a partially dithered white block adjacent to a black block.

FIG. 4 illustrates another implementation of a dithered white block adjacent to a black block.

FIG. 5 illustrates yet another implementation of a dithered white block adjacent to a black block.

FIG. 6 illustrates another implementation of a dithered white block adjacent to a black block.

FIG. 7 illustrates two message carriers using different implementations of the dithered white blocks.

FIG. 8 illustrates a vertical strip message carrier that runs along an edge of a display screen.

FIG. 10 is a block diagram illustrating the functionality associated with a universal digital assistant.

DETAILED DESCRIPTION

Figure 9:
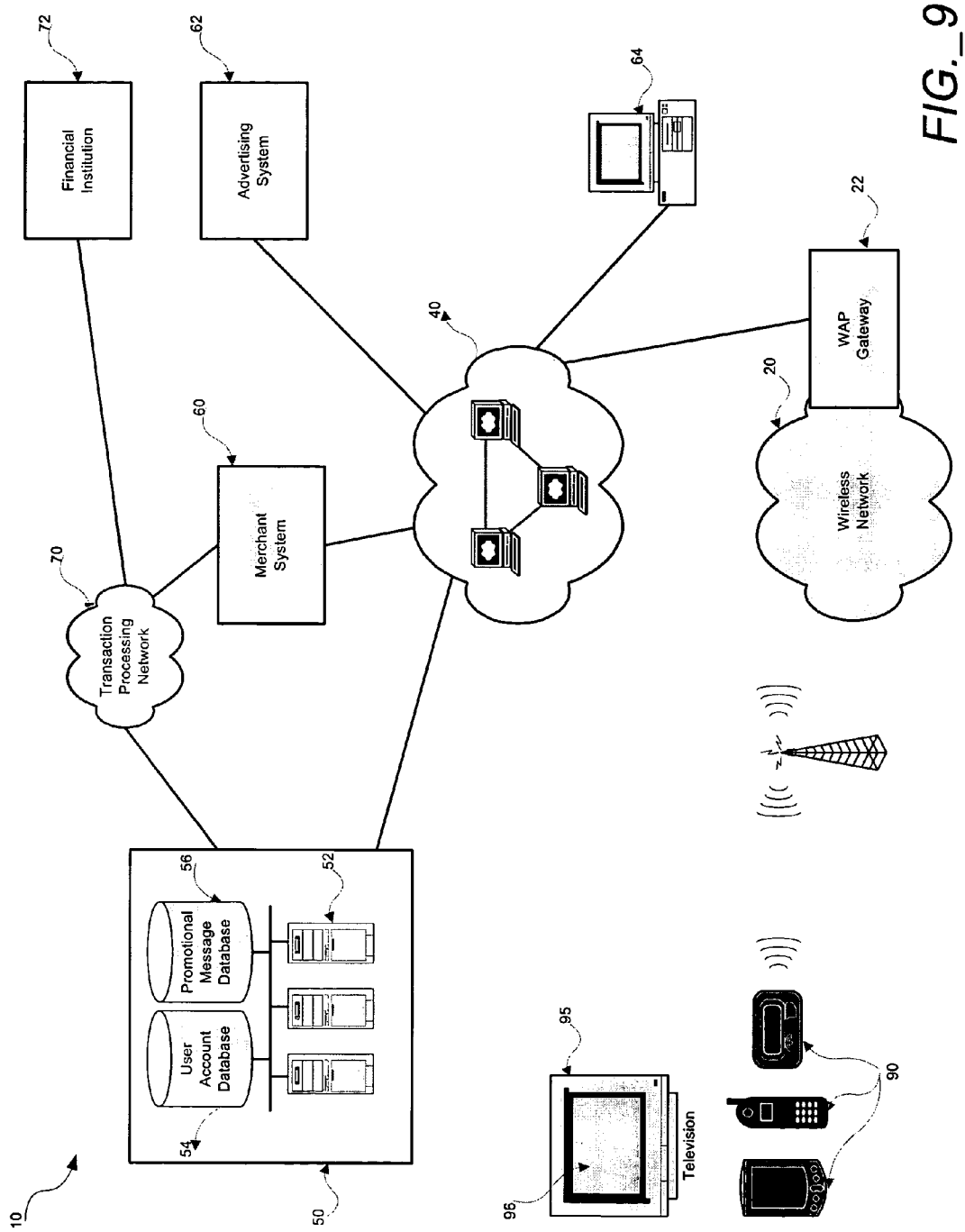
FIG. 9 sets forth a computer network environment including an interactive electronic commerce system.

FIG. 1 illustrates a message carrier 100 that presents at least one message code on a television or other display screen 96. Message carrier 100 utilizes a block-based encoding scheme resembling an overt checkerboard-like design. The normal television image occupies most of display screen 96 while message carrier 100 is generally displayed in one of the corners or on the side of display screen 96. Users can be informed, through advertising and the like, that when a message carrier 100 appears on a television screen, they should capture a digital image of message carrier 100 if they desire further information or promotions associated with a product or service shown. The display of message carrier 100 can act as a signal to a user that they can use a digital image capture device, such as a digital camera built into a mobile telephone, to capture a digital image of display screen 96 with message carrier 100. Users can also be informed that message carrier 100 includes a message code that can be transmitted to a remote system and the user will then receive information or a promotional message related to the product or service.

The block-based encoding scheme of message carrier 100 uses a series of two-dimensional blocks. The blocks use at least two intensity levels and the intensity levels of the blocks achieves a binary encoding scheme. In such an implementation, a digital image of message carrier 100 can be captured and processed to read the pattern of blocks using either the intensity level of the blocks or the transitions between blocks. Reading the pattern of blocks yields the message code.

In one implementation, message carrier 100 of FIG. 1 uses low-intensity regions 102 (e.g., dark-colored blocks such as black) and high-intensity regions 104 (e.g., light-colored blocks such as white) to represent bits that form the message code. For instance, low-intensity regions 102 can represent one bit value (e.g., a value of "0") and high-intensity regions 104 can represent another bit value (e.g., a value of "1"). The use of low-intensity regions 102 and high-intensity regions 104 provides an acute distinction between the two data values, thereby improving the reliability of data detection by any device that is configured to extract the message code from message carrier 100. Alternately, transitions between regions can be used to represent data. For example, a transition from high to low-intensity or from low to high-intensity can represent a "1" bit, while the absence of a transition (i.e., two adjacent blocks of the same intensity level) can represent a "0" bit. In the implementation shown, both low-intensity regions 102 and high-intensity regions 104 are squares or blocks. In other implementations, however, the regions can be any shape possible, including but not limited to circles, ovals, rectangles, triangles, pentagons, and other polygons. In addition, the data can be represented by a cell pair. Specifically if the cell pair is a low intensity cell adjacent to a high intensity cell this transition can represent one bit value (e.g., a value of "0") and if the cell pair is a high intensity cell adjacent to a low intensity cell this transition can represent another bit value (e.g., a value of "1").

As is known to one of ordinary skill in the art, colors on a television or computer display can be characterized by the intensity level (0 to 255) of each of the primary color components (i.e., red, blue, and green) used to form that color. For instance, the low-intensity color black is represented as 0 red, 0 blue, and 0 green, while the high-intensity color white is represented as 255 red, 255 blue, and 255 green. Because all three components of the color white are at the highest intensity level available, white regions 104 used in message carrier 100 are particularly susceptible to blooming effects and ISI when captured in a digital image.

FIG. 2 illustrates the blooming effects associated with a message carrier 100 displayed by a television or other display device. Light transmitted by high-intensity regions 104 of message carrier 100 can overwhelm photosites of an image sensor in a digital image capture device. As the photosites convert the light into electrical charges, they reach their maximum capacity and the excess charge overflows into neighboring photosites. As these neighboring photosites reach their maximum capacities, the charge continues to overflow until photosites are reached that can absorb this excess charge. For a digital image of message carrier 100, the photosites corresponding to low-intensity regions 102 of message carrier 100 generally absorb this excess charge. As the photosites for low-intensity regions 102 absorb the overflowing charge, high-intensity regions 104 appear to "bloom" and overtake portions of low-intensity regions 102. The digital image is then altered and several low-intensity regions 102, as well as transitions between regions, become corrupted by the overflowing charge. The resolution needed to decode message carrier 100 is often lost.

Implementations of the invention employ modifications to message carrier 100 to counteract the blooming effects and ISI. As described above, blooming effects occur when charge overflows from photosites corresponding to high-intensity regions 104. Therefore, in accordance with the invention, the intensity level of certain portions of each high-intensity region 104 is reduced to create a buffer for the overflowing charge. These areas with lowered intensity levels are referred to herein as dithered regions. Photosites capturing the dithered regions are now at a lower intensity level and can absorb some of the overflowing charge. This substantially prevents the charge from overflowing into neighboring low-intensity regions 102 of message carrier 100. Furthermore, as the dithered regions absorb the excess charge, their intensity levels will often rise to match the intensity level of high-intensity regions 104; therefore, these dithered regions will appear substantially similar to high-intensity regions 104 in the captured digital image that is processed as described below.

FIG. 3A illustrates one implementation of the invention where a high-intensity region of message carrier 100 is modified to minimize the blooming effects. FIG. 3A illustrates a high-intensity region 300 adjacent to low-intensity region 102, both of which can be used in message carrier 100. FIG. 3A also shows an overall intensity profile 302, measured from 0 to 255, for the two regions along a cross-section A-A'. According to this profile 302, an intensity level of 255 represents the color white, an intensity level of 0 represents the color black, and intensity levels between 0 and 255 represent various shades of gray. Thus, in this implementation, the intensity levels for each of the individual color components (i.e., red, blue, and green) are changed evenly so their values remain equal. This dithering methodology, however, can also be applied to message carriers that only use one of the primary color components.

As shown in profile 302, high-intensity region 300 includes a middle region 304 at a high-intensity level (e.g., 255 for white) and includes at least one dithered region 306 at a lower intensity level to minimize the blooming effects. In some implementations, the shape of dithered region 306 generally corresponds to the shape or perimeter of high-intensity region 300. Here, since the shape of high-intensity region 300 is square, the shape of dithered region 306 is square as well. In another implementation shown in FIG. 3B, the shape of dithered region 306 generally follows the transition between high-intensity region 300 and low-intensity region 102. Returning the FIG. 3A, dithered region 306 is shown in profile 302 as having an intensity level slightly below 255. According to the invention, the intensity level of dithered region 306 can be any value that is less than the intensity value of middle region 304 (e.g., 255) and higher than 0. The width and intensity level of dithered region 306 can be adjusted based on how strong the blooming effects are for a given combination of display screen type and digital image capture device. The width and numbers of the encoded dithered region increase as the ISI levels increase. The width of dithered region 306 has a lower limit that is based on the pixel size of the display screen. Dithered region 306 appears as a shade of gray when displayed on a television or computer display.

Unlike high-intensity region 300, low-intensity region 102 has a single intensity level (e.g., 0 for black) across its entire cross-section. This is also shown in profile 302. In most implementations of the invention, only the high-intensity regions of message carrier 100 are modified with dithered regions because the low-intensity regions generally do not cause blooming effects to occur.

In another implementation of the invention, high-intensity region 300 includes a second dithered region 308 that can surround dithered region 306 with an even lower intensity level. The shape of dithered region 308 can generally correspond to the shape of high-intensity region 300 or dithered region 306. In implementations of the invention, the intensity level of dithered region 308 can be any value that is less than the intensity value of middle region 304 (e.g., 255) and higher than 0. In the implementation shown, the intensity level of dithered region 308 is slightly lower than the intensity level of dithered region 306, as shown in intensity profile 302. In other implementations, the intensity level of dithered region 308 can be lower than the intensity value of middle region 304 but higher than the intensity level of dithered region 306. Dithered region 308 also appears as a shade of gray when displayed on a television or computer display. In further implementations of the invention, any number of dithered regions with varying intensity levels can be added to high-intensity region 300.

In the implementation shown in FIG. 3A, when a digital image of high-intensity region 300 and low-intensity region 102 is captured, blooming effects will still occur to photosites capturing middle region 304. The photosites capturing dithered region 306 and dithered region 308, however, will be at a lower intensity level (i.e., less than 255) and will therefore have the capacity to absorb a substantial amount of the charge overflowing from photosites capturing middle region 304. This prevents a substantial amount of the charge from overflowing into photosites capturing low-intensity regions 102, thereby minimizing the corruption of the transition between high-intensity region 300 and low-intensity region 102 in the captured digital image. Dithered regions 306 and 308 therefore substantially prevent the blooming effects from expanding beyond the edges of high-intensity region 300.

In a captured digital image of the implementation shown, dithered regions 306 and 308 tend to appear substantially white because their intensity levels will increase to at or around 255 as they absorb the overflowing charge. Low-intensity regions 102 will appear substantially as solid black squares since the blooming effects will be minimized by dithered regions 306 and 308. Thus, in a captured digital image, message carrier 100 will generally appear as a series of substantially solid white blocks and solid black blocks.

FIG. 4 illustrates another implementation of a dithered high-intensity region 400 adjacent to low-intensity region 102. In this implementation, high-intensity region 400 includes a middle region 402 that is at a high-intensity level (i.e., 255 for white). High-intensity region 400 also includes dithered regions to minimize blooming effects and ISI. One dithered region is a circular dithered region 404 that is at a lower intensity level than middle region 402. In this implementation, the shape of the dithered region does not correspond to the shape of high-intensity region 400. The intensity level of circular dithered region 404 can be any value that is less than the intensity level of middle region 402 (e.g., 255) and higher than 0. In one implementation, the intensity level of circular dithered region 404 is slightly less than the intensity level of middle region 402.

High-intensity region 400 also includes a second dithered region 406 that surrounds circular dithered region 404 and has an even lower intensity level. The intensity level of second dithered region 406 can be any value that is less than the intensity level of middle region 402 and higher than 0. In the implementation shown, the intensity level of second dithered region 406 is slightly lower than the intensity level of circular dithered region 404. In other implementations, the intensity level of second dithered region 406 can be lower than the intensity level of middle region 402 but higher than the intensity level of the circular dithered region 404. As described above, the width and intensity level of circular dithered region 404 and second dithered region 406 can be adjusted based on how strong the blooming effects are for a given combination of display screen type and digital camera. Both circular dithered region 404 and second dithered region 406 appear as shades of gray on a television or computer display screen. In further implementations of the invention, any number of circular dithered regions with varying intensity levels can be added to high-intensity region 400.

FIG. 5 illustrates yet another implementation of the invention with a dithered high-intensity region 500 adjacent to low-intensity region 102. In this implementation, high-intensity region 500 has a middle region 502 that is at a high intensity level (i.e., 255 for white) and includes a series of dithered regions 504 that are spaced apart. The spacing allows portions of high-intensity region 500 to appear between dithered regions 504, as shown at areas 500A. Dithered regions 504 can have an intensity level that is lower than the intensity level of middle region 502 (e.g., 255) and higher than 0. In one implementation, the intensity level of dithered regions 504 is slightly less than the intensity level of middle region 502. The use of spaced apart dithered regions 504 in this implementation provides a technique by which the blooming effects can be controlled or mitigated over a larger area. For example, in a particularly large high-intensity region 500, dithered regions 504 can be used to retard the build-up of overflowing charge, thereby preventing the edges of high-intensity region 500 from being overwhelmed. The areas 500A are included to ensure that dithered regions 504 do not cause the intensity level of the outer areas of high-intensity region 500 to fall substantially below the intensity level of middle region 502. In an implementation, dithered regions 504 can be used in conjunction with dithered regions 306 and 308, as shown in FIG. 3A, to counteract blooming effects. In another implementation, the intensity levels of the dithered regions 504 are not equal. Again, the width and intensity level of dithered regions 504 can be adjusted based on how strong the blooming effects are for a given combination of display screen type and digital camera.

FIG. 6 illustrates a variation of the implementation shown in FIG. 5. FIG. 6 illustrates a dithered high-intensity region 600 adjacent to low-intensity region 102. High-intensity region 600 includes a middle region 602 that is at a high intensity level (i.e., 255 for white) and includes a series of spaced apart circular dithered regions 604 surrounding middle region 602. High-intensity region 600 can be seen in between circular dithered regions 604 at areas 606. As in the implementation of FIG. 5, circular dithered regions 604 can have an intensity level that is lower than the intensity level of middle region 602 and higher than 0. In one implementation, the intensity level of circular dithered regions 604 is slightly less than the intensity level of middle region 602. As described above, the use of a series of circular dithered regions 604 provides a technique by which the blooming effects can be controlled or mitigated over a larger area. In an implementation, circular dithered regions 604 can be used in conjunction with dithered regions 404 and 406 as shown in FIG. 4. In another implementation, the intensity levels of circular dithered regions 604 are not equal. As before, the width and intensity level of circular dithered regions 604 can be adjusted based on how strong the blooming effects are for a given combination of display screen type and digital camera.

In an alternative implementation of the invention, the dithered regions can be applied only to sides of high-intensity region 104 where a transition occurs between high-intensity region 104 and low-intensity region 102. For example, in FIGS. 3 to 6, a transition occurs only on one lateral side of each of the high intensity regions. Therefore, in this implementation, there is only one transition that requires a dithered region. This is shown in FIG. 3B. In other implementations, the dithered regions can be applied anywhere within the high-intensity regions that they are needed to minimize blooming effects and ISI. In further implementations, dithered regions can be applied anywhere on the television or computer display screen 96 where transitions occur between high-intensity regions and low-intensity region anywhere. This allows users to capture digital images of the actual television images themselves without the images being corrupted due to blooming effects and ISI. The television images can be captured in addition to, or in lieu of, message carriers 100.

FIG. 7 shows a display screen 96 displaying two different message carriers 100. Message carrier 100A utilizes the dithered high-intensity regions 300 shown in FIG. 3A. Message carrier 100B implements the dithered high-intensity regions 400 shown in FIG. 4. FIG. 7 illustrates how message carriers 100A and 100B appear to a viewer when displayed on a television or computer display screen 96. In a captured digital image, however, both message carriers 100A and 100B will more closely resemble message carrier 100 of FIG. 1 due to blooming effects from the middle regions of the high-intensity regions being absorbed by the dithered regions.

In implementations of the invention, message carrier 100 can pair high-intensity regions that are white with low-intensity regions that are black. In other implementations, message carrier 100 can pair high-intensity regions that are white with low-intensity regions that are colors other than black. For example, a color combination of white and green can be used to implement the binary encoding scheme used by message carrier 100. In such an implementation, the intensity level of the green blocks will be 0 red, 0 blue, and 255 green, while the white blocks will still be 255 red, 255 blue, and 255 green. The intensity level of the dithered regions can be manipulated by lowering the intensity levels of only the red and blue components while leaving the green component intact. The dithered regions will therefore appear as shades of green rather then shades of gray. Other colors, including but not limited to black, brown, blue, green, purple, and red, can also be used. Dark colors tend to work better than lighter colors. Similar techniques can be used for the other colors used in message carriers 100. In some implementations of the invention, the dithered regions can be implemented for each and every high-intensity region 104 used in message carrier 100. In other implementations, the dithered regions can be implemented only in areas where a transition occurs between high-intensity region 104 and low-intensity region 102.

Other implementations of the message carrier are also possible. For example, in one implementation shown in FIG. 8, the message carrier can be a vertical strip message carrier 800 that runs along an edge of display screen 96. As FIG. 8 illustrates, message carrier 800 can be oriented along the left side of display screen 96; however, message carrier 800 can extend along any edge of screen 96, including the top, right, or bottom edges. Message carrier 800 can include dithered regions 802 on high-intensity regions to counteract any blooming effects and ISI that can occur.

Although the implementations shown above use block-shaped high-intensity regions and low-intensity regions, further implementations of the message carrier can use regions that are any other shape. For instance, in one implementation, the message carrier can use circular high and low-intensity regions. In another implementation, the message carrier can be formed using an array of high-intensity circles or another shape on a low-intensity background. In yet another implementation, the message carrier can be formed using low-intensity circles or another shape on a high-intensity background.

In another implementation of the invention, message carriers 100 using dithered high-intensity regions can be used in print media and the like. In particular, print media that uses high-gloss paper or highly reflective paper can benefit from the use of implementations of the invention. The highly reflective surface of glossy paper can reflect too much light back to the photosites of a digital camera, particularly if a flash is used when capturing the digital image. The use of dithered high-intensity regions can counteract the subsequent blooming effects that can occur.

The message carriers of the invention can be used in electronic commerce systems to transmit data to users. One such electronic commerce system is described in U.S. patent application Ser. No. 10/618,445 entitled "Interactive Electronic Commerce and Message Interchange System," which is incorporated by reference. FIG. 9 illustrates an electronic commerce system 10 utilizing a data encoding and decoding scheme according to one implementation of the invention. As FIG. 9 illustrates, electronic commerce system 10 includes one or more universal digital assistants (UDA) 90 that can receive data from a media source, for example, a display device 95 having display screen 96. In implementations of the invention, the display device 95 can be a television or a computer monitor. Electronic commerce system 10 also includes a UDA application site 50 that interacts with UDA 90 to facilitate financial transactions and carry out other processes as described herein. UDA 90 interacts with UDA application site 50 through a telecommunications network 20 and a computer network 40. Electronic commerce system 10 can also include a merchant system 60, an advertising system 62, at least one network access device such as client computer 64, at least one transaction processing network 70 (e.g., an Automated Clearing House (ACH) network, credit card network, etc.), and one or more financial institutions 72.

Telecommunications network 20 can be a wireless telephone network (as shown in FIG. 9), a land-based telephone network, and/or a combination thereof. Telecommunications network 20 can be any suitable digital or analog wireless network, such as a Time Division Multiple Access (TDMA) network, a Global System for Mobile communication (GSM) network, or a Code-Division Multiple Access (CDMA) network.

Telecommunications network 20 enables transmission of voice and other data to mobile wireless devices, such as UDA 90. Telecommunications network 20 therefore enables communication between UDA 90 and other systems operably connected thereto. In one implementation, telecommunications network 20 includes a Wireless Application Protocol (WAP) gateway 22, which provides a set of communication protocols enabling wireless devices, such as UDA 90, to access the Internet or similar computer network 40. WAP gateway 22 is operative to establish a connection (e.g., a Wireless Session Protocol (WSP) connection) with UDA 90, to receive requests designating an application server or other resource on computer network 40 from UDA 90, to translate the request into a hypertext transfer protocol (HTTP) or other suitable request to the appropriate application server, to receive a response from the application server, and to translate and transmit the response to UDA 90. Alternatively, the transmission of data between UDA 90 and UDA application site 50 can occur over a Short Message Service (SMS) gateway. In one implementation, the client functionality of UDA 90 is operative to configure SMS messages into a predefined format recognized by UDA application site 50.

Computer network 40 can be any suitable computer network, including but not limited to an Internet Protocol (IP) network, such as the Internet. Computer network 40 can be an open, wide-area network (WAN), an electronic network, an optical network, a wireless network, and/or any combination thereof. Computer network 40 can be a packet-based communications environment, employing Transmission Control Protocol/Internet Protocol (TCP/IP) standards and having a plurality of interconnected digital packet transmission stations operative to route data between TCP/IP end systems. The invention, however, has applications in computer network environments employing any suitable transport layer and network layer protocols.

UDA 90, in one implementation, is a wireless device that provides computing and information storage and retrieval capabilities for applications installed therein. UDA 90 is operative to communicate with remote devices over telecommunications network 20. In one implementation, UDA 90 includes hardware and/or software operative to acquire message codes using one or more code capture technologies and then communicate such codes to UDA application site 50. UDA application site 50 is operative to return at least one promotional message to UDA 90 for display or other action to the user. The functionality associated with UDA 90 can be integrated into a variety of wireless device platforms, such as cell phones, wireless personal digital assistants (PDA), universal remote controllers, television remote controllers, pagers, wearable computing devices, and the like. In one implementation, the functionality of UDA 90 is incorporated into a television or set-top television receiver remote control unit.

UDA 90 can further include short-range wireless functionality for wireless communication of data with a second device, such as a point-of-sale (POS) terminal or any other suitably configured device. This functionality can be implemented using, for example, infrared signals (e.g., IRDA), radio signals (e.g., 802.11 technologies (Wi-Fi) or Bluetooth), short burst Ethernet, wireless network signals (e.g., GSM, TDMA, or CDMA), and message services such as SMS and Multimedia Message Service (MMS). Such functionality allows UDA 90, for example, to transmit credit card account information and other information directly to a POS terminal equipped with complementary wireless communication functionality.

UDA 90, in one implementation, is also operative to receive data from telecommunications network 20 (or computer network 40) and transmit data to telecommunications network 20 (or computer network 40) for routing to appropriate devices. UDA 90, in one implementation, is an Internet-enabled device capable of receiving data from remote servers and displaying data on a user interface screen. In one implementation, UDA 90 is a WAP-enabled device, such as a WAP mobile phone, that includes a WAP client (e.g., a Wireless Application Environment (WAE) user agent, such as a WAP browser, and a Wireless Telephony Application (WTA) user agent). In another implementation, UDA 90 can be a wireless PDA including HTML compliant or HTML-supported browser functionality, such as Pocket PC including Pocket Internet Explorer® (PIE), which is a mobile version of Microsoft's Internet Explorer®, including limited Javascript support and the ability to display HTML and Macromedia Flash files (assuming the Flash plug-in is installed).

FIG. 10 is a block diagram illustrating the functionality of UDA 90 according to one implementation of the invention. As FIG. 10 illustrates, UDA 90 includes an image capture device 1002, a display device 1004, an antenna 1006, a client application control logic 1008, and a wireless communication interface 1010.

Image capture device 1002 is operative to capture digital images of message carriers 100 with dithered high-intensity regions and message codes transmitted in visual media. In one implementation, image capture device 1002 can comprise a digital camera allowing for the capture of images containing message codes. The digital camera can include an image sensor (not shown), such as a charge-coupled device (CCD) or a complementary metal-oxide semiconductor (CMOS) sensor, to capture a digital image. The image sensor is generally composed of thousands of photosites that receive light passing through the lens of the digital camera. This light is converted into electrical charges by the photosites and, as explained above, there is a limit to how much charge each photosite can store. Having dithered regions on the high-intensity regions of message carrier 100 therefore minimizes the drawbacks of the photosites. Display device 1004 is a liquid-crystal or other display device. In one implementation, display device is a touch-sensitive liquid crystal display device.

Client application control logic 1008 executes the client-side functionality described herein, such as processing captured digital images of message carrier 100 to acquire message codes and transmitting the message codes through wireless communication interface 1010 to UDA application site 50. Because message carriers 100 use dithered high-intensity regions, blooming effects and ISI should not corrupt low-intensity regions 102 of the digital image that is processed. The image processing functionality of client application control logic 1008 can process a digital image by reading intensity values of the pixels that form the digital image, and then analyzing those intensity values to identify patterns or other behavior. Generally, the pixels are read by scanning vertical columns of pixels in the digital image, known as vertical scan lines. The pixel values can also be read by scanning horizontal rows of pixels, known as horizontal scan lines. Wireless communication interface 1010 is operative to establish and maintain a connection to telecommunications network 20 using antenna 1006 to enable communication of data between UDA 90 and remote devices.

As one skilled in the art will recognize, the functionality described above can be integrated into existing wireless device platforms. For example, client application control logic 1008 can be implemented into a mobile telephone with an embedded runtime environment such as Java. The runtime environment can execute a script or byte code program to perform the functions described herein and use the wireless communication system of the phone to transmit and receive data from remote devices. Furthermore, image capture device 1002 can also be integrated into a mobile telephone. There are already numerous mobile telephones on the market that include image capture devices 1002. Some examples include, but are not limited to, the Sony Ericsson® T610, the Samsung® A600, the Sanyo® VM4500, the Motorola® V300, and the Nokia® 3650.

UDA application site 50 is connected to computer network 40 to communicate with end systems and other nodes operably connected thereto, such as client computer 64. UDA application site 50 interacts with UDA 90 through computer network 40, WAP gateway 22, and wireless telecommunications network 20 to facilitate data interchanges, financial transactions, and other operations as described herein. UDA application site 50 can be configured to support a variety of wireless devices, including IMode phones, and mobile wireless devices including Binary Runtime Environment for Wireless (BREW) or Java 2 Platform Micro Edition (J2ME) technologies. In one implementation, UDA application site 50 includes at least one application server 52, a user account database 54, and a promotional message database 56.

Application server 52 includes functionality implementing the process flows described herein. User account database 54 stores information related to at least one user account. Such user account information includes a user account identification, name, address, e-mail address, as well as system settings, preferences, user profile information (e.g., psychographic information, demographic information, and behavioral information) obtained by monitoring a user's use of the system or by direct interaction with the user through questionnaires and the like. User account database 54 can also store financial account information for at least one user to facilitate financial transactions using UDA 90.

Promotional message database 56 stores promotional messages, such as advertisements, coupons, and other commercial offers, in association with one or more message codes. In one implementation, advertising system 62 transmits promotional messages in electronic form to promotional message database 56 for storage in association with message codes. In another implementation, application server 52 can receive a message code from UDA 90 and return one or more promotional messages associated with that message code, as discussed herein.

UDA 90 operates in connection with UDA application site 50 to enable users to receive and review advertising, promotional, informational and other messages, as well as conduct financial transactions and other operations. According to an implementation of the invention, UDA 90 acquires message codes (e.g., from television advertisements or print advertisements) and transmits them to UDA application site 50, which pushes an advertising or promotional message back to UDA 90 in return. Advertising and promotional messages can take a variety of forms, including but not limited to electronic coupons, product pricing, descriptive data, loyalty offerings, and other similar items. According to one implementation, a user can elect to save the advertising or promotional message for later use or inspection by storing it locally on UDA 90 or remotely on UDA application site 50 in association with his or her user account.

To facilitate initiation and maintenance of user accounts, users may access UDA application site 50 through network access devices over computer network 40 to manage their respective user accounts through network access devices connected to computer network 40. In one implementation, the network access device is a browser executed on a client computer 64, or another browser executed on a network computer (not shown). In one implementation, page-based interfaces for accessing UDA application site 50 are transmitted to client computer 64 having a browser and a connection to computer network 40.

Client computer 64 can include any computer, special-purpose computing device, or any other suitable device having the required functionality. In one implementation, client computer 64 includes at least one processor, a data storage system (including volatile and non-volatile memory), at least one input device (e.g., a keyboard), and at least one output device (e.g., a display). In one implementation, client computer 64 is connected to computer network 40 through a modem connection (e.g., dial-up, DSL, or cable) or through a network line. Such connections can be wireless as well. In addition, although implementations of the system are described as working in conjunction with a browser, any suitable device, application, or client software for receiving, displaying, and transmitting data over a computer network can be used. In one implementation, the browser implemented on client computer 64 supports the SSL ("Secure Sockets Layer") protocol, the S-HTTP or HTTPS ("Secure HTTP") protocol, or any other similar protocol for transmitting confidential or private information over an open computer network. Users are individuals or other legal entities having the capacity to possess financial accounts, such as corporations, partnerships, non-profit organizations, trusts, and the like.

Client computer 64 is a TCP/IP end system operably connected to computer network 40 via any suitable means, such as through an Internet Services Provider (ISP) and the like. Client computer 64 can be any suitable internet-enabled computing device, including but not limited to a desktop computer, a laptop computer, a mobile telephone, a personal digital assistant (PDA), or UDA 90 having wireless or wired access to computer network 40. The wireless or wired access can be through a router, a wireless router executing the 802.11 wireless protocol, Mobitex, DataTAC, General Packet Radio Service (GPRS), or any other packet-switched wireless network. In one implementation, client computer 64 includes internet browsing software for receiving, displaying, and transmitting data over a computer network.

Payment transaction processing network 70 supports a variety of non-cash payment mechanisms, including but not limited to purchases made by credit card, debit card, and Automated Clearing House (ACH) transactions. In one implementation, payment transaction processing network 70 can be a credit card or debit card transaction processing network, such as Visa®, MasterCard®, Discover®, or American Express®. In one implementation, payment transaction processing network 70 enables users, using UDA 90, to provide non-cash methods of payment to a merchant system 60 or at a POS terminal.

Financial institution 72 is where users maintain financial accounts, such as checking accounts, savings accounts, money market accounts, credit and/or debit card accounts, and other financial accounts. A user can have one or more bank accounts at each of one or more financial institutions. For example, a user can have a checking account and a credit and debit card account at one financial institution and still have a credit account with a different financial institution.

As discussed above; UDA 90 is operative to detect and acquire message codes in message carriers 100 using one or more code capture technologies. For example, UDA 90 can be configured to acquire message codes from broadcast media, print media, or wireless transmissions. In one implementation, UDA 90 is operative to acquire message codes in message carrier 100 which is embedded or otherwise transmitted in connection with a television broadcast signal and displayed on a display device 95, such as a television or computer display. For example, UDA 90 can include a code capture technology whereby a user can aim UDA 90 at display device 95 and capture a digital image of message carrier 100 being shown on display screen 96. The captured digital image or a portion thereof is then processed to locate message carrier 100 and identify a message code that is then acquired. For example, UDA 90 can use image capture device 1002 to capture a digital image and then use the image processing functionality of client application control logic 1008 to locate and acquire a message code in the captured image. In one implementation of the invention, UDA 90 can emit a beam of light (e.g., a Class II laser pointer) that can assist a user to aim the image capture device of UDA 90 at screen 96. This is useful in situations where the user cannot see what the image capture device is pointed at. In another implementation, the view through the image capture device can be shown to the user on display screen 1004 of UDA 90, thereby eliminating the need for a laser pointer.

After a digital image of message carrier 100 is captured, UDA 90 can process the digital image to retrieve a message code contained in message carrier 100. The message code can contain any type of data and can identify any of a number of items. For example, in one implementation the message code can identify the television station to which display device 95 is tuned (e.g., station call letters or a station identifier). In such an implementation, an advertisement or promotional message can then be identified using the station identifier and the time the station identifier was captured. In one implementation, UDA application site 50 can scan this information against a station log to resolve the advertising or other content the user was watching. UDA application site 50 can then return an advertising or promotional message associated with the broadcast advertising or other content.

In another implementation, the image processing functionality can reside on a remote server and the captured image can be transmitted to this remote server for processing. Such an implementation moves the burden of processing the digital image to a remote server that will typically have much greater processing power than UDA 90. The time required to process the captured image will then be reduced. UDA 90 can transmit the captured image to the remote server using any of the wireless technologies described herein, for instance, the captured image can be transmitted in an MMS message.

One or more features of message carrier 100 can be preset or constant to allow client application control logic 1008 of UDA 90 to locate message carrier 100 in a captured image and then locate the message code within the message carrier. When the image processing functionality of client application control logic 1008 reads and analyzes the intensity values of pixels in the captured image (e.g., using vertical scan lines or horizontal scan lines), these preset or constant features can be detected and message carrier 100 can then be identified. From there, the message code can then be identified and acquired.

In one implementation, message carrier 100 can have one or more borders 106 (shown in FIG. 1) that remain constant as the message code changes. For example, the one or more borders 106 can be one continuous color such as black. This can aid the image processing functionality of client application control logic 1008 in locating message carrier 100. In one implementation, a two-sided border 106 can be used around message carrier 100 to aid in its identification, where two-sided border 106 is one continuous color. As shown in FIGS. 1 and 7, each message carrier 100 includes top and left border regions 106 that are colored black or any other suitable color. Accordingly, the checkerboard region is bordered on two sides by a black color, and by the television image on the third and fourth sides. The image processing functionality of client application control logic 1008 can use two-sided border 106 to locate message carrier 100 and can then filter out two-side border 106 to extract the message code itself.

In one implementation, UDA 90 executes a process to decode the message code that includes capturing an image of the display screen including message carrier 100, analyzing vertical scan lines through the captured image to identify scan lines that intersect message carrier 100, locating and aligning an edge of message carrier 100, optionally validating one or more features surrounding the transitions, and reading the data bits in the message code.

As discussed above, UDA 90 includes image capture device 1002 to capture a digital image of display screen 96 containing message carrier 100. The user aims image capture device 1002 at a television that is displaying message carrier 100, then the user triggers the capture functionality to capture a digital image. The image can be pre-processed to indicate which pixels are white, which pixels are black, and which pixels are neither (i.e., a middle tone), thus reducing each pixel to a two-bit value (e.g., 11 for a white pixel, 10 for a black pixel, and 00 for a middle tone pixel). The middle tone should generally represent much of the television image and any surrounding items in the camera image. In one implementation, the image processing functionality located message carrier 100 by analyzing vertical scan lines to find solid border 106. In this implementation, the image processing functionality is looking for a large range of pixels that are all the same color.

In an implementation, border 106 can be made wider or taller than the blocks that form the message code. Using an over-sized border improves the likelihood of a vertical scan line passing through border 106 in its entirety when the image processing functionality is trying to locate message carrier 100. Since the captured image may not be properly aligned, depending on how the user was holding the image capture device 1002 when the image was captured, the vertical scan lines may be at an angle relative to message carrier 100 and border 106. The use of an over-sized border 106 increases the range of allowable angles for the vertical scan lines relative to border 106 where a vertical scan line can still pass through an entire border 106.

After a message code is acquired, UDA 90 can transmit the message code to UDA application site 50 which resolves the message code and pushes an electronic commerce and/or data message back to UDA 90. In one implementation, application server 52 receives a request including the message code and accesses promotional message database 56 to retrieve a promotional message associated with the message code. If a promotional message is located, application server 52 pushes the promotional message to UDA 90. Application server 52 can also carry out other functions such as tracking the user's interests and behavior. For example, application server 52 can generate a log, stored in association with the user's account, which records the message codes received from the user and the promotional messages sent in response. In one implementation, application server 52 can use the log to track system usage by the user to enable a fee-based service for advertisers. For example, an advertiser can be charged a fee for each promotional message pushed to a user's UDA 90. In addition, UDA application site 50, in one implementation, can be configured to transmit usage or activity reports to advertising system 62 detailing the activity associated with promotional messages and/or user purchasing behavior.

Lastly, the invention has been described with reference to specific implementations. Other implementations of the invention will be apparent to those of ordinary skill in the art. It is, therefore, intended that the scope of the invention not be limited to the implementations described above.

The invention claimed is:

1. A computer-implemented method of extracting a message code from a message carrier that is displayed on a display screen comprising:
   transmitting, with a computer, a first portion of a signal that defines an image of a high-intensity region, wherein the high-intensity region represents a first data bit value of the message code;
   transmitting, with the computer, a second portion of the signal that defines an image of a dithered region that absorbs overflowing charge from the high-intensity region, wherein the dithered region is located adjacent to the high-intensity region; and
   transmitting, with the computer, a third portion of the signal that defines an image of a low-intensity region, wherein the low-intensity region represents a second data bit value of the message code and is located adjacent to the dithered region;
   wherein the images of the high-intensity region, the dithered region, and the low-intensity region are captured from the display with a universal digital assistant and the message code is extracted from the images.

2. The method of claim 1, wherein the display screen comprises a television screen or a computer monitor screen.

3. The method of claim 1, wherein the high-intensity region comprises a white block.

4. The method of claim 1, wherein the low-intensity region comprises a block having a color chosen from the group consisting of black, brown, blue, green, purple, and red.

5. The method of claim 1, wherein the high-intensity region has a first intensity level.

6. The method of claim 5, wherein the first intensity level is around 255.

7. The method of claim 5, wherein the dithered region comprises at least one border having a second intensity level that is lower than the first intensity level.

8. The method of claim 7, wherein the dithered region comprises a plurality of borders, each border having an intensity level that is lower than the first intensity level.

9. The method of claim 8, wherein each of the plurality of borders has a different intensity level.

10. The method of claim 9, wherein the plurality of borders are arranged in order based on their intensity levels such that the border with the highest intensity level is adjacent to the high-intensity region and the border with the lowest intensity level is adjacent to the low-intensity region.

11. The method of claim 8, wherein the plurality of borders are spaced apart such that the high-intensity region is visible between each border.

12. The method of claim 7, wherein the shape of the border is tetragonal.

13. The method of claim 7, wherein the shape of the border is circular.

14. The method of claim 7, wherein the shape of the border matches the shape of at least a portion of the high-intensity region.

15. The method of claim 1, wherein the dithered region completely surrounds the high-intensity region.

16. The method of claim 1, wherein the message code is communicated using the first data bit value and the second data bit value.

17. A computer-implemented method of transmitting a message carrier containing a message code to a user comprising:
   displaying a high-intensity region on a display screen, wherein the high-intensity region represents a first data bit value of the message code;
   displaying a low-intensity region on the display screen, wherein the low-intensity region represents a second data bit value of the message code and is located adjacent to the high-intensity region along an edge;
   displaying a dithered region on the display screen that absorbs overflowing charge from the high-intensity region, wherein the dithered region is located on the high-intensity region at or near the edge;
   capturing, with a universal digital assistant (UDA), the images of the high-intensity region, the dithered region, and the low-intensity region on the display screen; and
   extracting, with the UDA the message code from the images.

18. The method of claim 17, wherein the display screen comprises a television screen or a computer monitor screen.

19. The method of claim 17, wherein the high-intensity region comprises a white block and the low-intensity region comprises a block having a color chosen from the group consisting of black, brown, blue, green, purple, and red.

20. The method of claim 17, wherein the high-intensity region has a first intensity level.

21. The method of claim 20, wherein the dithered region comprises at least one border having a second intensity level that is lower than the first intensity level.

22. The method of claim 21, wherein the dithered region comprises a plurality of borders, each border having an intensity level that is lower than the first intensity level.

23. The method of claim 22, wherein each of the plurality of borders has a different intensity level.

24. The method of claim 23, wherein the plurality of borders are arranged in order based on their intensity levels such that the border with the highest intensity level is adjacent to the high-intensity region and the border with the lowest intensity level is adjacent to the low-intensity region.

25. The method of claim 22, wherein the plurality of borders are spaced apart such that the high-intensity region is visible between each border.

26. The method of claim 21, wherein the shape of the border is tetragonal.

27. The method of claim 21, wherein the shape of the border is circular.

28. The method of claim 21, wherein the shape of the border matches the shape of at least a portion of the high-intensity region.

29. The method of claim 17, wherein the message code is communicated using the first data bit value and the second data bit value.

30. A universal digital assistant (UDA) for extracting a message code comprising:
   a memory for storing executable instructions; and
   a processor, the processor configured to implement instructions stored in the memory; and
   an image capturing device for capturing an image from a display comprising:
      a high-intensity region that represents a first data bit value of a message code;
      a dithered region that absorbs overflowing charge from the high-intensity region, wherein the dithered region is located adjacent to the high-intensity region; and
      a low-intensity region that represents a second data bit value of the message code, wherein the low-intensity region is located adjacent to the dithered region.

31. The UDA of claim 30, wherein:
   the high-intensity region comprises a white block,
   the low-intensity region comprises a colored block, and
   the color is chosen from the group consisting of black, brown, blue, green, purple, and red.

32. The UDA of claim 30, wherein the high-intensity region has a first intensity level.

33. The UDA of claim 32, wherein the dithered region comprises at least one border having a second intensity level that is lower than the first intensity level.

34. The UDA of claim 33, wherein the dithered region comprises a plurality of borders, each border having an intensity level that is lower than the first intensity level.

35. The UDA of claim 34, wherein each of the plurality of borders has a different intensity level.

36. The UDA of claim 35, wherein the plurality of borders are arranged in order based on their intensity levels such that the border with the highest intensity level is adjacent to the high-intensity region and the border with the lowest intensity level is adjacent to the low-intensity region.

37. The UDA of claim 34, wherein the plurality of borders are spaced apart such that the high-intensity region is visible between each border.

38. The UDA of claim 33, wherein the shape of the border is tetragonal.

39. The UDA of claim 33, wherein the shape of the border is circular.

40. The UDA of claim 33, wherein the shape of the border matches the shape of at least a portion of the high-intensity region.

41. A system for receiving a broadcast signal comprising:
   a display device having a display screen for displaying a message carrier, the message carrier comprising:
      a first portion that defines an image of a high-intensity region, wherein the high-intensity region represents a first data bit value of a message code;
      a second portion that defines an image of a dithered region that absorbs overflowing charge from the high-intensity region, wherein the dithered region is located adjacent to the high-intensity region; and
      a third portion that defines an image of a low-intensity region, wherein the low-intensity region represents a second data bit value of the message code and is located adjacent to the dithered region; and
   a universal digital assistant (UDA) for capturing the message code from the display device and for extracting the message code from the message carrier.

42. The system of claim 41, further comprising a UDA application site that interacts with the UDA to facilitate financial transactions and push a plurality of advertisements to the UDA.

43. The system of claim 41, further comprising an application server for receiving the message code from the UDA and returning at least one advertisement associated with the message code to the UDA.

* * * * *